United States Patent [19]

Fisher

[11] 4,257,619
[45] Mar. 24, 1981

[54] VARIABLE RATIO ROTARY POSITIONING MECHANISM AND CAMERA DOLLY STEERING MECHANISM EMBODYING SAME

[76] Inventor: James L. Fisher, 10918 Burbank Blvd., North Hollywood, Calif. 91601

[21] Appl. No.: 945,887

[22] Filed: Sep. 26, 1978

[51] Int. Cl.³ .............................................. B62D 7/06
[52] U.S. Cl. ...................................... 280/91; 74/497; 280/99
[58] Field of Search .................... 74/497, 498; 280/91, 280/99, 47.11, 93, 771; 180/245

[56] References Cited

U.S. PATENT DOCUMENTS

| | | | |
|---|---|---|---|
| 2,715,534 | 8/1955 | Hoge et al. | 280/91 X |
| 2,901,265 | 8/1959 | Knight et al. | 280/91 |
| 3,031,024 | 4/1962 | Ulinski | 74/498 X |
| 3,077,354 | 2/1963 | Rateau | 280/99 |
| 3,189,366 | 6/1965 | Ulinski | 74/498 X |
| 3,463,506 | 8/1969 | Drake | 280/91 |
| 3,546,957 | 12/1970 | Adams | 74/497 |
| 4,003,584 | 1/1977 | Zelli | 280/91 |

*Primary Examiner*—John J. Love
*Assistant Examiner*—Norman L. Stack
*Attorney, Agent, or Firm*—Donald R. Nyhagen

[57] ABSTRACT

An adjustable turning ratio ratary positioning mechanism has rotary drive and driven members coupled by a flexible drive band, such as a sprocket chain, with oppositely movable runs between the members which are laterally displaceable during rotation of the drive member in such a way as to selectively provide the positioning mechanisms with different predetermined turning ratios, i.e., the turning angle(s) of the driven member(s) per unit turning angle of the drive member. A camera dolly steering mechanism embodying a rotary positioning mechanism according to the invention actuated by a single cam on the dolly steering shaft for selectively steering the dolly in round, crab, and conventional steering modes.

18 Claims, 19 Drawing Figures

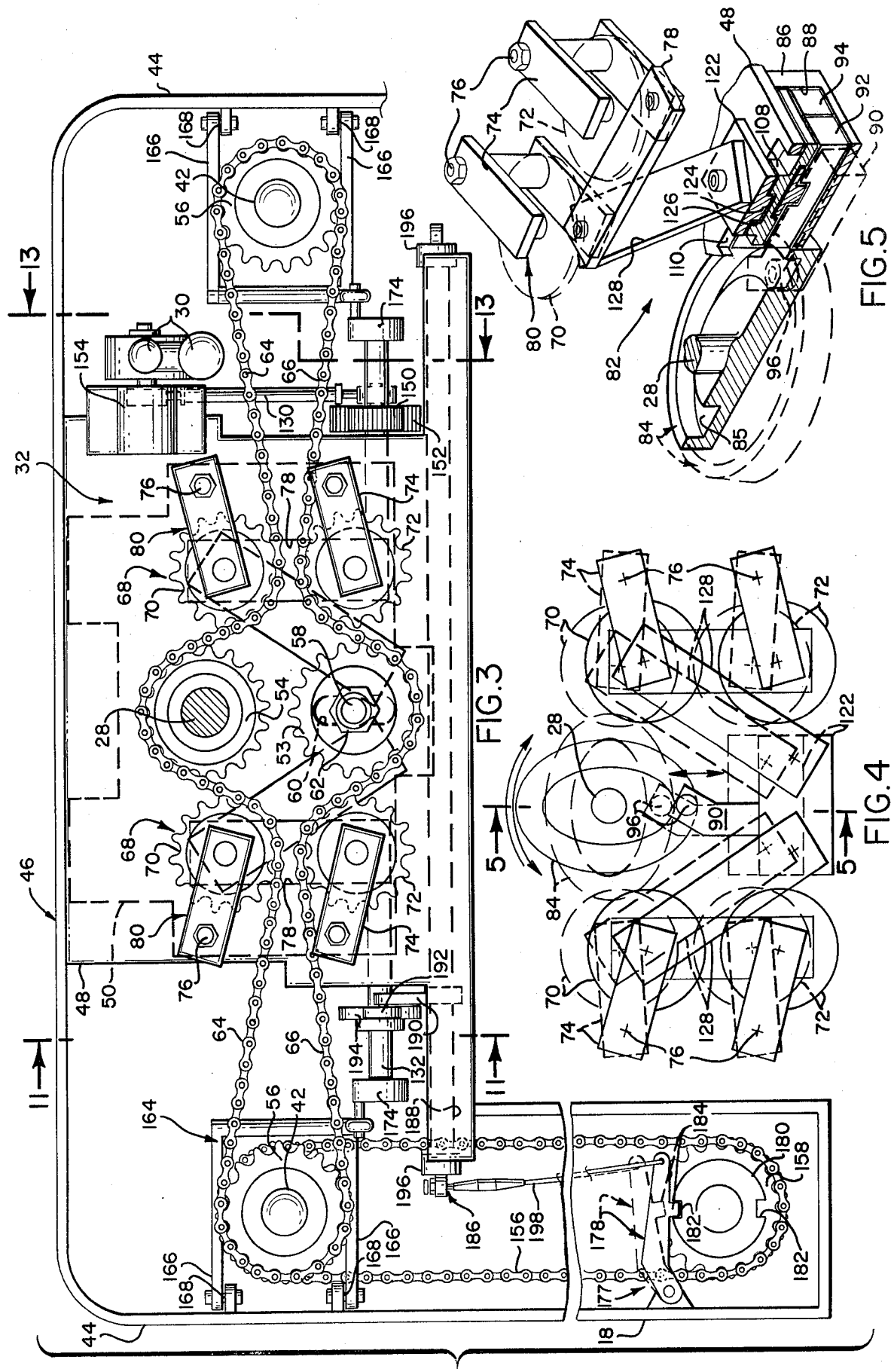

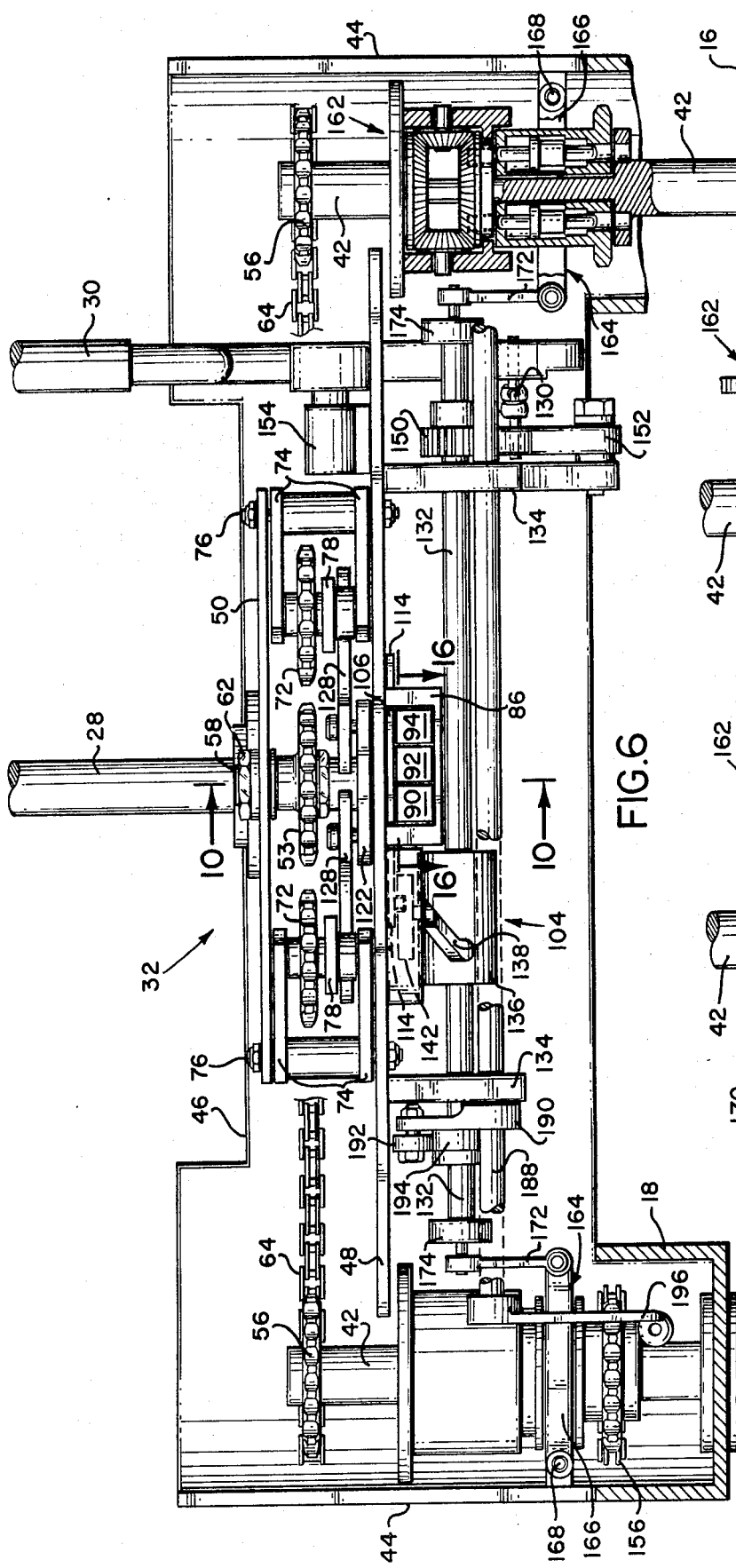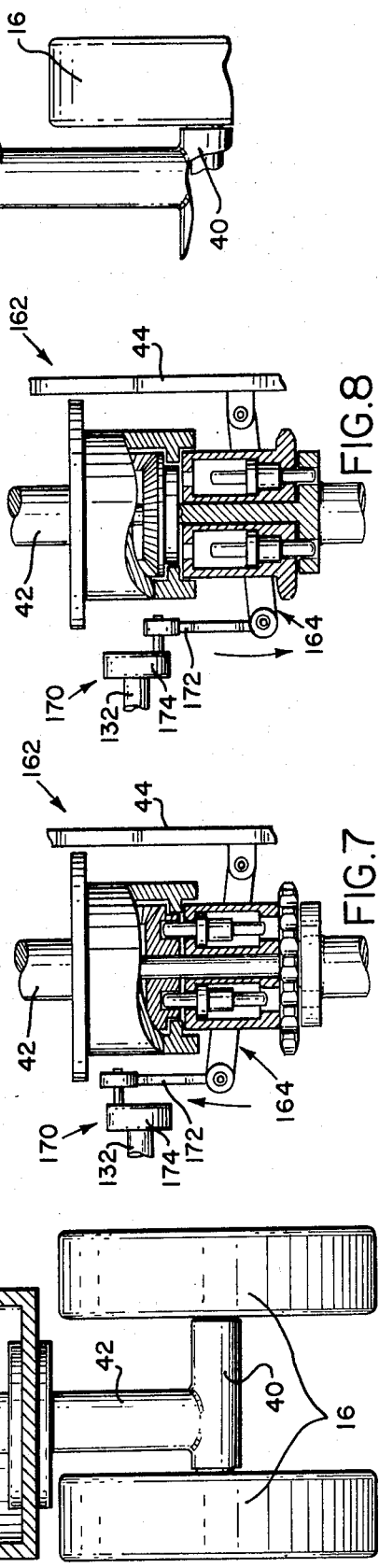

VARIABLE RATIO ROTARY POSITIONING MECHANISM AND CAMERA DOLLY STEERING MECHANISM EMBODYING SAME

BACKGROUND OF THE INVENTION

1. Field of the Invention

This invention relates generally to rotary positioning mechanisms of the class having one or more rotary driven members rotatably positionable by a rotary drive member. The invention relates more particularly to such a rotary positioning mechanism having a selectively adjustable turning ratio which is the turning angle of the driven member(s) per unit turning angle of the drive member. The invention relates also to a novel camera dolly steering mechanism embodying the adjustable ratio positioning mechanism with a single steering shaft cam for selectively steering the dolly in round, conventional, and crab steering modes.

2. Background of the Prior Art

In its broader aspects, this invention relates to a rotary positioning mechanism of the general class having rotary drive and driven members coupled by transmission means in a manner which permits rotary positioning of the driven member(s) by the drive member and adjustment of the transmission turning ratio, i.e., the turning angle of the driven member(s) per unit turning angle of the drive member. Rotary positioning mechanisms of this general class are known and are susceptible of a variety of uses. One of these uses is in a steering mechanism for dollys, such as camera dollys. A more limited aspect of the present invention is concerned with a camera dolly steering mechanism which utilizes the rotary positioning mechanism of the invention to effect selective steering of the dolly in round, crab, and conventional steering modes. The invention will be described in the context of this camera dolly steering application.

Camera dollys are used in the motion picture and television industries as movable supporting platforms for television and motion picture cameras. A typical camera dolly has a frame supported on four steerable wheels and mounting a hydraulically operated boom for supporting the camera. The wheels are connected to a steering shaft or the like for turning of the wheels in their steering movement by turning of the steering shaft. For convenience, the wheel positions in which the wheel planes parallel the longitudinal axis of the dolly, i.e., the wheel rotation axes are normal to the longitudinal axis, such that the dolly is movable along a straight line in the fore and aft direction, are called their neutral positions.

Camera dollys are operable in different steering modes. The improved dolly of this invention, for example, are referred to herein as round, crab, and conventional steering modes. In the conventional steering mode, the front wheels are locked in their neutral positions. The rear wheels are coupled to the steering shaft for steering of the dolly along a straight or curved path by turning of the rear wheels only. When the rear wheels are turned from their neutral positions, their rotation axes intersect the common axis of the front wheels approximately at a common point, such that the dolly moves along an arc having its center at the axis intersection point.

In the crab steering mode, all of the wheels are coupled to the steering shaft for turning in unison on their steering axes in response to turning of the steering shaft in such a way that the wheel rotation axes remain parallel. The dolly is then always movable in a straight line and can be steered to move in any horizontal direction.

Finally, in the circular steering mode, all of the dolly wheels are again coupled to the steering shaft for steering movement by turning of the shaft. In this case all the wheel rotation axes intersect at approximately a common point which moves back and forth along a transverse axis of the dolly passing midway between the front and rear wheels as the wheels are turned by the steering shaft. Dolly movement is then substantially circular about the axis intersection point and, in one position of wheel adjustment, occurs about the geometric center of the dolly wheels.

The prior art is replete with a number of patents covering steering systems for dollys and other vehicles. Examples of such steering systems and other similar systems are found in the following patents:

U.S. Pat. No. 545,165
U.S. Pat. No. 2,055,747
U.S. Pat. No. 2,228,247
U.S. Pat. No. 2,232,015
U.S. Pat. No. 2,235,044
U.S. Pat. No. 2,227,458
U.S. Pat. No. 2,423,266
U.S. Pat. No. 2,200,736
U.S. Pat. No. 2,472,442
U.S. Pat. No. 2,468,801
U.S. Pat. No. 2,001,647
U.S. Pat. No. 2,234,888
U.S. Pat. No. 2,470,496
U.S. Pat. No. 2,203,810
French Pat. No. 451,813
U.S. Pat. No. 2,661,672
U.S. Pat. No. 1,951,147
U.S. Pat. No. 2,319,880
U.S. Pat. No. 1,801,043
U.S. Pat. No. 1,255,775
U.S. Pat. No. 1,866,393
U.S. Pat. No. 2,388,692
U.S. Pat. No. 2,352,797
U.S. Pat. No. 2,470,496
U.S. Pat. No. 2,715,534
U.S. Pat. No. 2,834,605
U.S. Pat. No. 2,842,376
U.S. Pat. No. 2,995,380
U.S. Pat. No. 1,175,312

In general, the dolly steering mechanisms described in these patents and other dolly steering mechanisms of which I am aware are characterized by a common deficiency which this invention addresses. The deficiency referred to resides in their complexity and resulting high cost. This complexity stems, in large part, from the type of steering adjustment which is utilized to shift the steering system between its various steering modes. In one common type of dolly steering mechanism, for example, the dolly steering shaft and wheels are coupled by sprocket chains trained about sprockets on the shaft and wheels. Steering movement of the wheels in the arcuate steering modes (i.e., round and conventional) is accomplished by laterally displacing or adjusting the sprocket chain runs between the wheels and steering shaft during turning of the shaft to turn the wheels. This lateral adjustment of the chain runs is commonly effected by a cam rotatable by the steering shaft and alters the linear travel of the sprocket chains about the wheel sprockets independently of the steering shaft rotation angle and thereby also the turning angles of the wheels per unit turning angle of the steering shaft. The lateral displacement of the sprocket chain runs and resulting variation in wheel turning angles occur in such a way as to achieve the desired steering modes.

In the prior art steering mechanisms of this kind of which I am aware, each steering mode requires its own sprocket chain coupling between the steering shaft and wheels and its own cam(s) for laterally displacing the chain runs to achieve the desired steering mode. As a consequence, these existing dolly steering mechanisms tend to be complex and costly.

BRIEF SUMMARY OF THE INVENTION

According to its broader aspects, this invention provides an adjustable ratio rotary positioning mechanism having rotary drive and driven members, drivably coupled by an adjustable ratio transmission including a flexible drive band, such as a sprocket chain, trained about and in rotary driving relation to the members. The drive member is thereby rotatable to rotatably position the driven member(s) through the drive band. The drive band has oppositely movable runs between the drive and driven members which are laterally adjustable or displaceable to vary the linear travel of the band about the driven member(s) independently of the drive member rotation and thereby the turning angle of the driven member(s) per unit turning angle of the drive member. This ratio of the turning angles is referred to herein as the turning ratio, or simply the ratio of the adjustable ratio transmission.

The transmission includes means for laterally displacing the drive band runs during rotation of the transmission drive member and through different distances per unit rotation angle of the drive member to vary the transmission turning ratio. The ratio of drive band run displacement per unit rotation angle of the drive member is referred to herein as the drive band run displacement ratio or simply displacement ratio of the transmission. A feature of the invention resides in a novel means actuated by a single cam rotatable with the drive member for laterally displacing the drive band runs in response to rotation of the transmission drive member and with different presettable displacement ratios including zero (i.e., zero run displacement per unit rotation angle of the drive member) to achieve different transmission turning ratios.

A more limited aspect of the invention is concerned with a camera dolly having a steering mechanism which utilizes the adjustable ratio transmission of the invention to accomplish the three different modes of camera dolly steering discussed earlier, namely, round, crab and conventional steering modes. The camera dolly has front and rear wheels connected by a transmission, referred to herein as an interwheel transmission, which is presettable to round, crab and conventional operating or steering modes. In the round steering mode, the interwheel transmission couples the front and rear wheels along each side of the dolly for rotation in unison but in opposite directions. In the crab steering mode, the interwheel transmission couples the front and rear wheels along each side for rotation in unison in the same direction. Finally, in the conventional steering mode, the interwheel transmission locks the front wheels in their neutral positions and releases the rear wheels only for steering movement.

The dolly has a rear steering shaft which forms the drive member of the adjustable ratio transmission utilized in the dolly steering mechanism. The drive band of this transmission couples the steering shaft to the rear dolly wheels directly and to the front dolly wheels indirectly through the interwheel transmission for steering movement of the wheels by turning of the steering shaft. The adjustable ratio tranmsission drive band displacing means includes a single cam rotatable with the steering shaft and a novel presettable, variable ratio motion translating and steering mode selector means operable to displace laterally the drive band runs extending between the steering shaft and rear dolly wheels. This variable ratio means is presettable to displace the drive band runs with the different transmission drive band run displacement ratios (including zero) required to achieve round, crab and conventional steering modes in response to turning of the steering shaft. A steering mode shift or selector device is provided for selectively and simultaneously presetting the adjustable ratio transmission and the interwheel transmission to the same steering modes for selective steering of the dolly in these modes by turning of the steering shaft. A primary feature of the invention resides in the arrangement of the steering mechanism, whereby only a single steering shaft cam is required for the three steering modes.

BRIEF DESCRIPTION OF THE DRAWINGS

FIG. 3 is an enlarged fragmentary plan view of the dolly steering mechanism looking in the direction of the arrows 3—3 in FIG. 1;

FIG. 4 is a fragmentary detail of the steering mechanism;

FIG. 5 is a section in perspective taken substantially along the line 5—5 in FIG. 4;

FIG. 6 is an enlarged section taken on line 6—6 in FIG. 2;

FIGS. 7 and 8 are fragmentary details of certain clutches embodied in the steering mechanism showing the clutches in two different positions of adjustment;

DESCRIPTION OF THE PREFERRED EMBODIMENT

Figure 1:
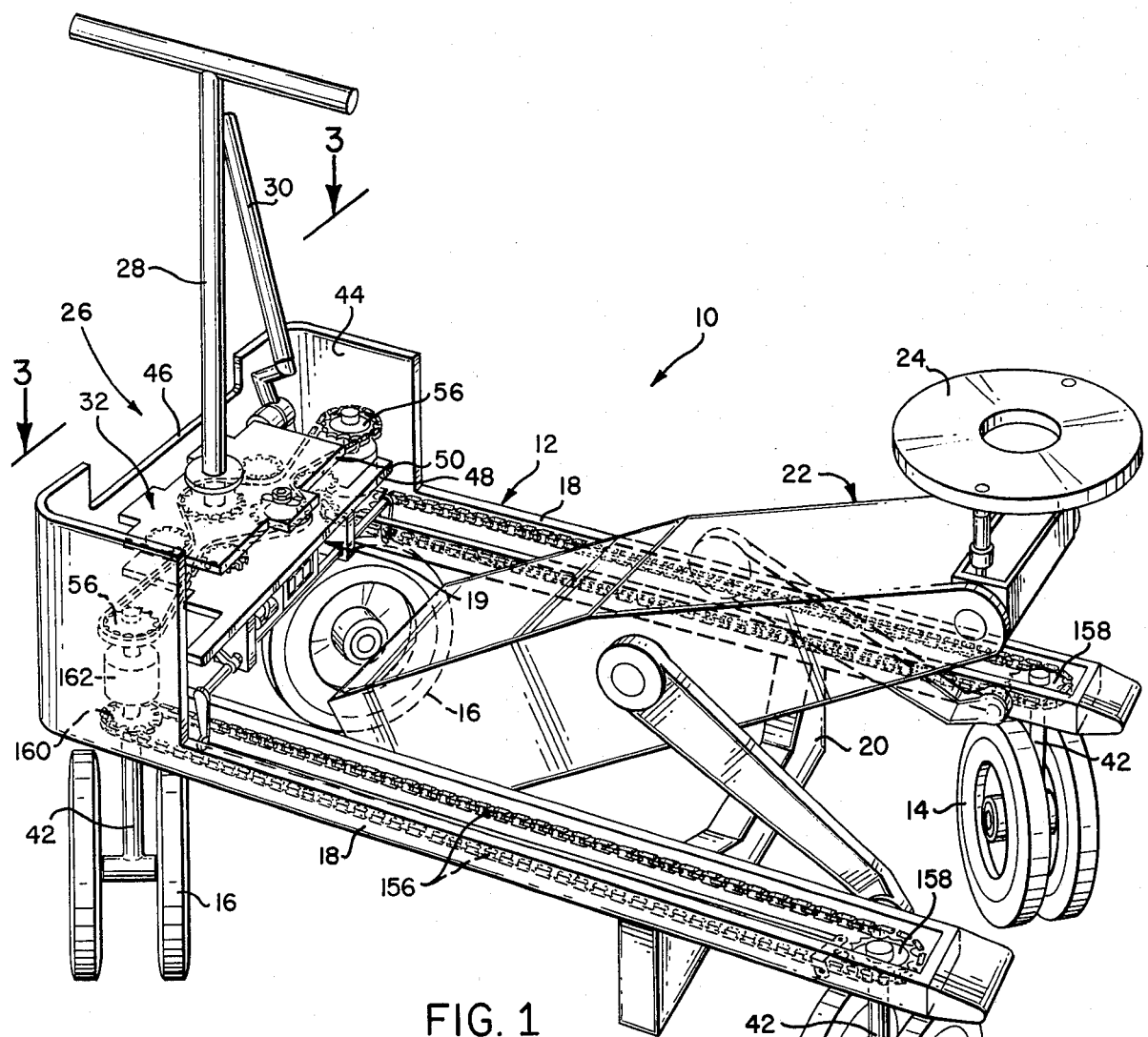
FIG. 1 is a perspective view of a camera dolly embodying the dolly steering mechanism of the invention.
Figure 2:
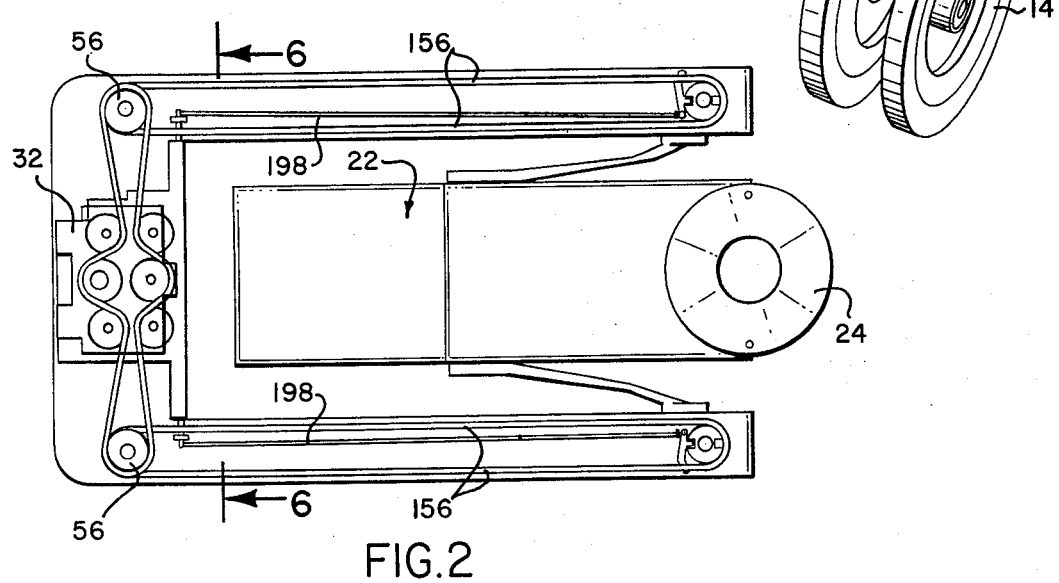
FIG. 2 is a top plan view of the dolly on reduced scale.

Turning to the drawings and first to FIGS. 1 and 2, the illustrated camera dolly 10 has a frame 12 supported on two front wheels 14 and two rear wheels 16. These wheels are mounted on the frame for turning in a steering movement on normally vertical axes. Frame 12 has two laterally spaced, holow longitudinal beam-like portions 18 extending along opposite sides of the frame and joined at their rear ends by a cross frame portion 19. Extending between and rigidly joining the frame beams 18 a short distance from their front ends is a reinforcing bridge 20. The front and rear wheels 14, 16 are located at the front and rear ends of the beams 18.

Located between the frame beams 18 is a camera boom 22 which is conventional and hence need not be described in detail. Suffice it to say that the particular camera boom shown embodies a hydraulic hoist or lift mechanism (not shown) for raising and lowering the boom and a camera mount 24 on the outer end of the boom which raises and lowers with the boom while remaining in a fixed attitude relative to the horizontal.

According to one of its more limited aspects, the invention provides a novel wheel steering mechanism 26 for the camera dolly. This steering mechanism is operable in the three steering modes mentioned earlier, namely, crab steering, conventional steering, and round steering modes. Included in the steering mechanism is an upstanding steering shaft 28 and a steering mode selector as shift lever 30 on the rear frame portion 19. The steering shaft 28 is coupled to the rear dolly wheels 16 by an adjustable ratio transmission 32 according to the invention for turning of the rear wheels in their steering movement by turning of the steering shaft. The turning ratio of this transmission (i.e., the turning angles of the rear wheels 16 per unit turning angle of the steering shaft 28) is variable to condition the steering mechanism 26 for its three steering modes. The front wheels 14 are coupled to the rear wheels 16 by an interwheel transmission 36. This interwheel transmission couples the front and rear wheels along each side of the frame for rotation in unison in the crab and round steering modes with the front and rear wheels turning in the same direction in the crab mode and in opposite directions in the round mode. In the conventional steering mode, the transmission 36 locks the front wheels 14 in their neutral positions parallel to the longitudinal axis of the dolly and releases the rear weels 16 for independent steering movement by the steering shaft 28.

Figure 14:
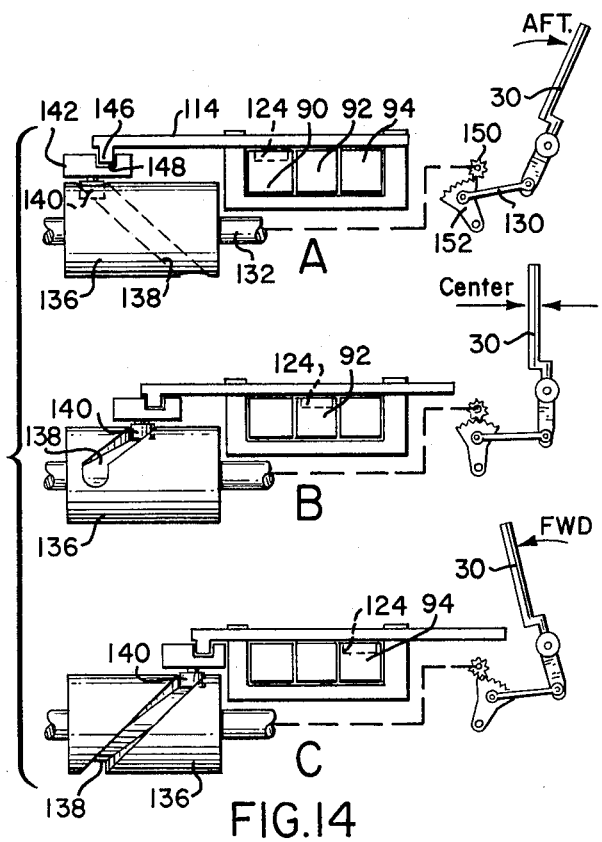
FIGS. 14A, 14B, 14C illustrate three positions of adjustment of a variable ratio motion translating and ratio selecting means embodied in the dolly steering mechanism.
Figure 17:
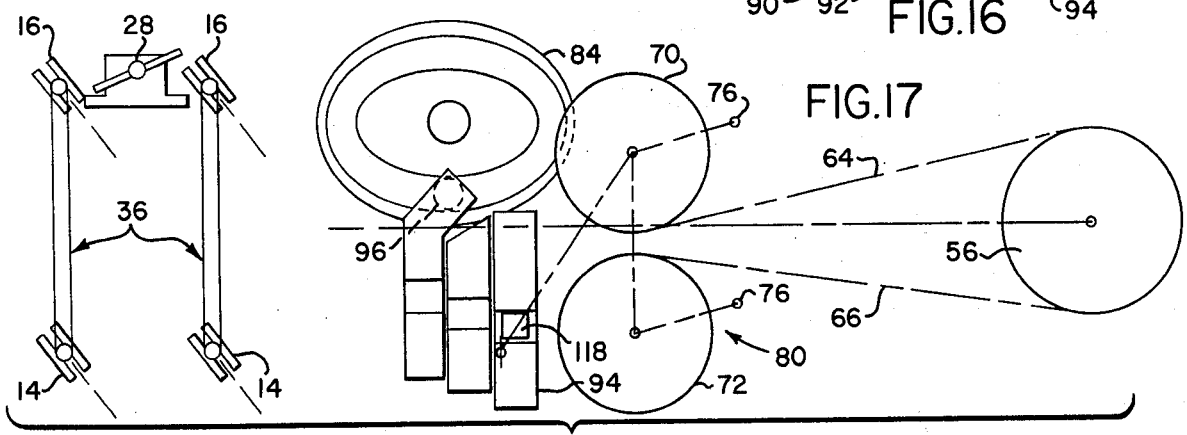
FIGS. 17-19 diagrammatically illustrate the steering mechanism of the dolly set for crab steering (FIG. 17), conventional steering (FIG. 18) and round steering (FIG. 19).
Figure 18:
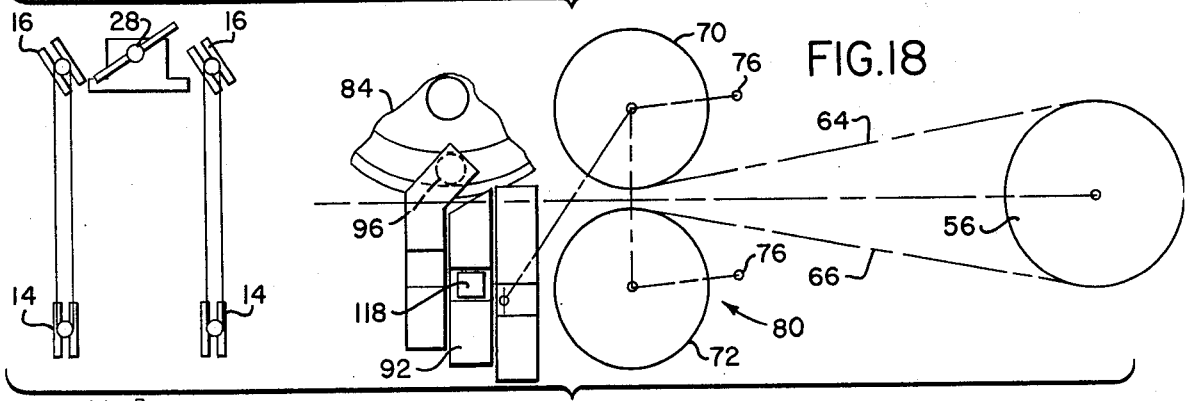
Figure 19:
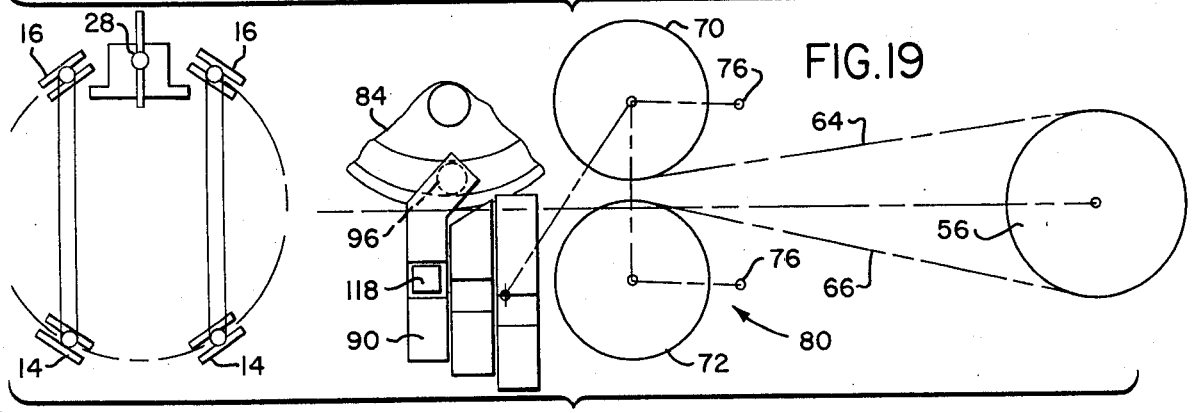

As shown in FIG. 14, the steering mode selector or shift lever 30 is movable to conventional (FIG. 14A), round (FIG. 14B), and crab (FIG. 14C) steering positions and is operatively connected to the transmissions 32, 36 for selectively presetting them in these steering modes in response to placement of the lever in the corresponding positions. These steering modes are illustrated in FIGS. 17-19 and will be explained in detail presently. Suffice it to say at this point that in the crab steering mode of FIG. 17, turning of the steering shaft 28 turns all four dolly wheels 14, 16 in unison on their steering axes in such a way that their horizontal wheel rotation axes remain parallel. Accordingly, in any fixed position of the steering shaft, the dolly is movable in a straight line, and such linear movement may occur in any horizontal direction of the dolly by appropriate positioning of the wheels about their steering axes.

In the conventional steering mode of FIG. 18, the two front wheels 14 are locked in their neutral positions and the rear wheels 16 are coupled to the steering shaft 28 so that turning of this shaft turns the rear wheels only on their steering axes in such a way that the wheel rotation axes always intersect at a point located approximately on the common rotation axes of the front wheels 14. Accordingly, in one fixed position of the steering shaft, the rear wheels planes parallel the longitudinal axis of the dolly and the latter is movable along a straight line in the fore and aft directions. In other positions of the steering shaft the dolly is movable along a curve or arc having its center at the intersection point of the rear wheel axes.

In the round steering mode of FIG. 19, all four dolly wheels 14, 16 are again coupled to the steering shaft 28, whereby all wheels are turned in their steering movement by turning of the steering shaft. In this mode, all the wheel rotation axes intersect approximately at a common point along an axis transverse to the dolly and located midway between the front and rear wheels. Dolly movement then occurs along a curve or arc having its center at the axis intersection point. In one position, this intersection point and hence the center of the dolly movement is located at the geometric center of the dolly wheels and the dolly movement is circular about this center, as shown.

Referring now in more detail to the drawings, the dolly wheels 14, 16 each have a pair of coaxial wheel members 38 rotatably supported on an intervening axle 40 with an upstanding journal 42. This journal is rotatably supported in the dolly frame 12 by a suitable bearing for turning of the corresponding wheel 14, 16 on its normally vertical steering axis. The two front wheels 14 are rotatably mounted on the front ends of the dolly frame beams 18. The rear wheels are rotatably mounted on the rear end of the frame at the junctures of the frame beams 18 and rear frame portion 19.

The rear frame portion 19 includes an upstanding side or edge wall 44 which extends across the rear end of the dolly frame 12 between the frame beams 18 and turns forwardly at its ends to form a rear frame housing 46 open at its front and top sides. These open sides may be closed by a removable cover (not shown). Firmly mounted in any convenient way within and extending horizontally across the interior of the frame housing 46 a distance above the level of the frame beams 18 is a mounting plate 48. A second horizontal mounting plate 50 is firmly supported in the frame housing a small distance above the mounting plate 48. Steering shaft 28 is journalled at its lower end in bearings carried by the mounting plates 48, 50 and is located approximately on the longitudinal center line of the dolly. The two rear wheels 16 are aligned laterally of the dolly a slight distance forwardly of the steering shaft, as may be best observed in FIGS. 1-3, and are located along the longitudinal center lines of the frame beams 18.

As noted earlier, the steering shaft 28 is coupled to the rear wheels 16 by the adjustable ratio transmission 32 of this invention. This transmission will now be described. The transmission includes an endless flexible drive band 52 trained about and in rotary driving relation to the steering shaft 28 and the rear wheel journal shafts 42. The drive band also engages an idler 53 located adjacent and directly forward of the steering shaft. Rotation or turning movement of the steering shaft thus turns the rear wheel shafts, and hence also the rear wheels on their vertical steering axes, through the drive band. In the drawings, the drive band 52 is a sprocket chain trained about a sprocket 54 fixed on the lower end of the steering shaft between the frame housing mounting plates 48, 50 and sprockets 56 fixed on the upper ends of the wheel shafts. The idler 53 is a sprocket also located between the mounting plates 48, 50 and rotatable on a shaft 58 extending through a fore and aft slot 60 in the upper mounting plate 50 for adjustment of the idler sprocket toward and away from the steering shaft 28. The idler sprocket 53 is secured in a fixed position of adjustment by a nut 62 threaded on the sprocket shaft 58. The sprockets 53, 54, 56 are located in a common horizontal plane passing between the mounting plates 48, 50, as shown best in FIG. 6.

Between each wheel shaft 42 and the steering shaft 28 and idler 53, the drive band 52 has a pair of oppositely movable runs 64, 66, that is, runs which travel endwise in opposite directions during turning of the steering shaft 28 in a similar direction to turn or steer the dolly wheels. The length of the drive band 52 is such that considerable slack exists in the runs 64, 66, whereby the latter are laterally adjustable or displaceable. According to the present invention, the adjustable ratio transmission 32 includes run adjusting or displacing means 68 for laterally adjusting or displacing the drive band runs 64, 66 during turning of the steering shaft 28 to steer the dolly in its conventional and round steering modes in such a way as to alter the turning ratio of the transmission 32. It will be recalled from the earlier discussion that this turning ratio is the turning angle of each rear wheel 16 per unit turning angle of the steering shaft 28. Run adjusting means 68 includes drive band guides 70, 72, in this instance sprockets, which engage the drive band runs 64, 66, respectively, to retain these runs taut. In this regard, it will be seen in FIG. 3, that the drive band 52 extends around the steering shaft sprocket 54, then around one guide 70 to and around the corresponding rear wheel sprocket 42, then around one guide 72 to and around the idler 53, then around the other guide 72 to and around the other wheel sprocket 42, and finally around the other guide 70 back to the steering shaft sprocket 54. Each pair of drive band guides 70, 72 are so located as to cause the corresponding drive band runs 64, 66 to curve inwardly toward one another in the regions between the steering shaft and idler sprockets 53, 54 and the corresponding wheel sprocket 56.

Before proceeding further with the description of the adjustable ratio transmission 32, it is helpful to consider its operation based on its description to this point. It is obvious that rotation of the steering shaft sprocket 54 through a given angle by the steering shaft 28 imparts to the drive band 52 an endwise travel or displacement which is a combined function of the sprocket turning angle and diameter. This endwise displacement or travel of the drive band is the same along its full length assuming the band continuously follows the same path throughout the entire sprocket turning angle. Such endwise travel of the drive band imparts a turning or rotary motion to each wheel journal shaft 42 through an angle which is a combined function of the drive band travel or displacement and the diameter of the wheel shaft sprocket 56. Assuming the steering and wheel shaft sprockets to have the same diameter, each rear wheel will turn through the same angle (and in the same direction) as the steering shaft.

Assume now that during turning of the steering shaft 28 the drive band runs 64, 66 between the steering shaft and each rear wheel shaft 42 are adjusted or displaced laterally in the plane of the drive band sprockets 53, 54, 56 in such a way that one run is increased and the other decreased in length while the combined length of the two runs remains substantially constant. This drive band run adjustment or displacement will increase or decrease the rotation angle of the wheel shaft 42 for a given turning angle of the steering shaft (i.e., the transmission turning ratio) depending upon the direction of lateral drive band run displacement with respect to the direction of endwise movement of the drive band. Thus, if the direction of lateral run displacement is such as to increase the length of the run which is moving toward the wheel shaft and decrease the length of the run which is moving away from the wheel shaft, the net endwise travel or displacement of the drive band around the wheel shaft sprocket 42 and hence the net rotation angle of the wheel shaft will be reduced in accordance with a function of the lateral run displacement. Displacement of the drive band runs in the opposite lateral direction with the same direction of steering shaft rotation will increase the net wheel shaft rotation angle. The drive band run adjusting or displacing means 68 effects this drive band run displacement in response to turning of the steering shaft 28 in such a way as to accomplish conventional and round steering of the present dolly.

Continuing now with the structural description of the adjustable ratio transmission 32, the drive band guide sprockets 70, 72 for each pair of drive band runs 64, 66 are movable in unison laterally of the runs to laterally displace the runs and thereby alter the turning ratio of the transmission 32 in the manner just explained. To this end, each sprocket 70, 72 is rotatably mounted between one one of a pair of spaced parallel arms 74. The opposite ends of these arms are pivotally mounted on a bearing post 76 firmly mounted between frame mounting plates 48, 50. The bearing posts 76 for each pair of guide sprockets 70, 72 are equally spaced from the rotation axes of their associate guide sprockets 70, 72 and are located in a plane substantially parallel to the common fore and aft plane of the steering shaft 28 and the idler sprocket 53. Extending between the free ends of the sprocket support arms 74 and pivotally attached to these arms on the sprocket axes is a connecting link 78.

From the foregoing description it is evident that the mounting arms 74, their bearing posts 76 and connecting link 70 for each pair of guide sprockets 70, 72 form a parallel bar mechanism 80 which supports the sprockets for movement in unison laterally of the respective drive band runs 64, 66. Unified movement of these sprockets in either direction displaces the runs laterally in such a way as to increase the length of one run and correspondingly decrease the length of the other run and alter the turning ratio of the transmission 32 in the manner explained earlier.

The parallel bar mechanisms 80 are operatively connected to the steering shaft 28 by an adjustable ratio motion translation and ratio selector mechanism 82 for effecting movement of all four drive band guide sprockets 70, 72 in unison to alter the transmission ratio in response to turning of the steering shaft in the round and conventional steering modes and for locking the sprockets in fixed positions in the crab steering mode. This motion translating and ratio selector mechanism, which constitutes an important feature of the invention, comprises a single cam disc 84 fixed to the steering shaft 28 below the lower frame mounting plate 48. Entering the upper surface of this cam disc is an annular cam track 85. The shape of this cam track will be explained presently. Suffice it to say here that the cam track is generally elliptical.

Mounted on the underside of the frame mounting plate 48 just forwardly of the cam disc 84, or cam as it will be called hereafter, is a channel-shaped guide 86 containing a guideway 88 which opens upwardly toward and is closed by the plate 48. Disposed side by side in this guideway are three ratio selector bars 90, 92, 94. Bars 90, 92 are slidably endwise in the guideway. Bar 94 is firmly fixed to the guide channel 86 and could form a portion of the channel. While not essential, the gap between the two movable or slide bars 90, 92 is located approximately in a plane of the steering shaft 28. The rear end of the slide bar 90 turns at an oblique angle toward the second slide bar 92 and carries at its underside a cam follower 96, such as a roller. This roller is located in the fore and aft plane of the steering shaft 28 and engages in the cam track 85 of the steering shaft cam 84. From this description, it will be understood that rotation of the cam 84 by the steering shaft 28 imparts endwise movement to the slide bar 90.

Figure 15:
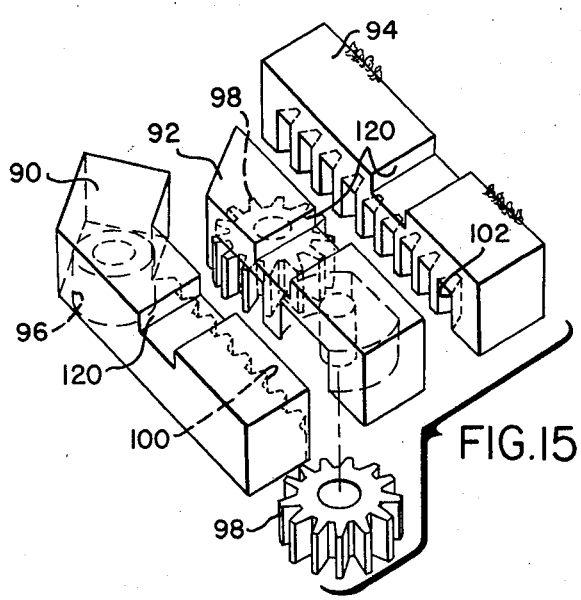
FIG. 15 is an enlarged fragmentary detail in perspective of a portion of the variable ratio means in FIG. 14.
Figure 16:
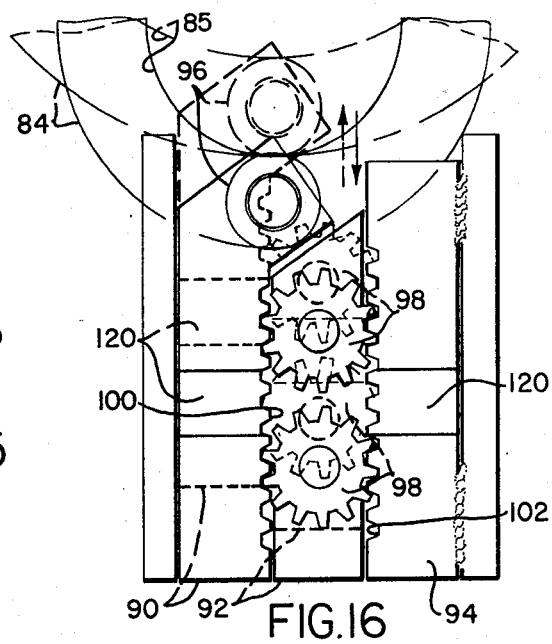
FIG. 16 is an enlarged section taken on line 16—16 in FIG. 6.

Referring to FIGS. 15 and 16, the center slide bar 92 carries a pair of rotatable pinions 98 within recesses in the bar. These pinions project radially beyond the opposite vertical sides of the bar 92 and mesh with a rack 100 on the adjacent side of the slide bar 90 and a rack 102 on the adjacent side of the fixed bar 94. The three bars 90, 92, 94 are thus coupled by the pinions 98 in such a way that given endwise displacement of the slide bar 90 in response to rotation of the steering shaft 28 imparts to the slide bar 92 an endwise displacement which is one half that of the slide bar 90.

The adjustable ratio mechanism 82 further comprises ratio selector means 104 actuated by the steering mode selector or shift lever 30 for selectively connecting the parallel bar mechanisms 80 which support the drive band guide sprockets 70, 72 to the bar 90, 92, 94 in the round, conventional and crab steering modes, respectively, in such a way that in the round and conventional modes, the sprockets are displaced laterally of the drive bands runs 64, 66 by endwise movement of the slide bars 90, 92, respectively. In the crab steering mode, the sprockets are locked in fixed position by the fixed bar 94. This ratio selector means comprises a plate 106 which is slidably disposed within the slide bar guideway 88 in the channel 86 between the bars 90, 92, 94 and the frame mounting plate 48. Plate 106 is slidable endwise of the guideway 88 and has a rectangular boss 108 on its upper face which projects upwardly through a slot 110 in the plate 48 extending parallel to the guideway 88.

Entering the underside of the plate 106 and extending transverse to the guideway 88 is a groove 112 slidably receiving a selector plate 114 for endwise movement of the selector plate transverse to the bars 90, 92, 94. The ends of the selector plate 114 extend through recesses 116 in the sidewalls of the guide channel 86, which recesses are sized to accommodate lateral movement of the selector plate with endwise movement of the slide plate 106. Depending from the underside of the selector plate 114 is a key 118 for selective engagement in slots 120 in the upper sides of the bars 90, 92, 94.

Figure 9:
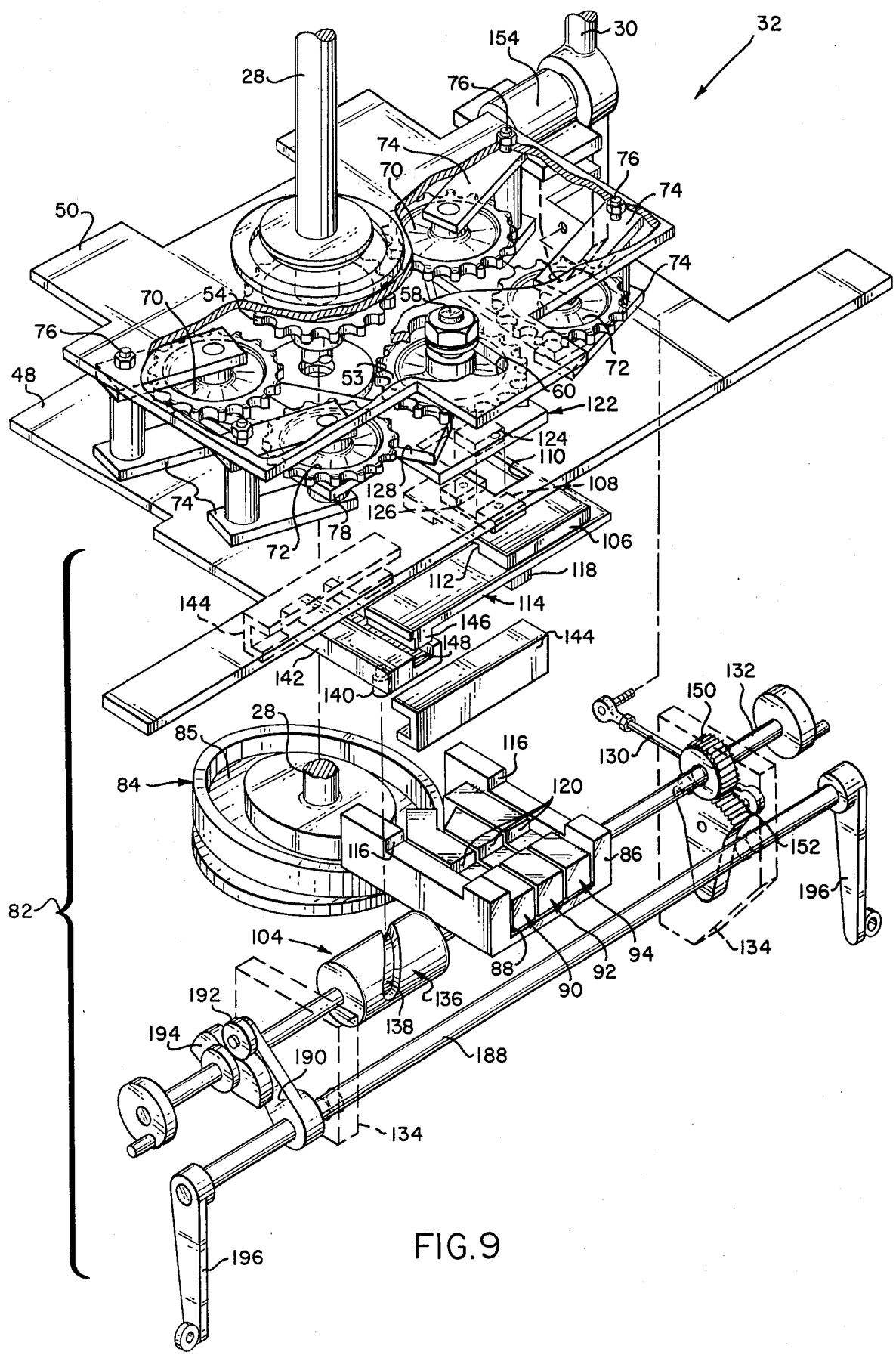
FIG. 9 is an enlarged fragmentary detail in perspective of the steering mechanism.
Figure 10:
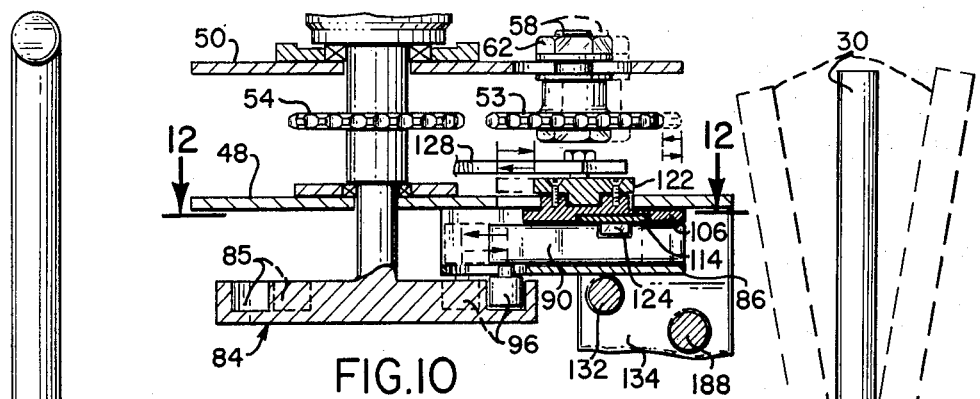
FIG. 10 is a section taken on line 10—10 in FIG. 6.

In the relative positions of these bars shown in FIG. 9, referred to herein as their normal positions, the bar slots 120 are aligned. Accordingly, the selector plate key 118 is movable from one slot to the other by endwise movement of the selector plate 114 relative to the slide plate 106. Endwise positioning of the selector plate 114 with its key 118 engaged in the slot 120 of either slide bar 90, 92 couples the bar and selector plate for lateral movement of the selector plate and hence endwise movement of the slide plate 106 with the respective slide bar. Endwise positioning of the selector plate 114 with its key 118 engaged in the slot 120 of fixed bar 94 locks the selector plate against lateral movement and hence the slide plate 106 against endwise movement relative to the frame 12.

From the description to this point then, it will be understood that the slide plate 106 may be selectively coupled to either slide bar 90, 92 for endwise movement with the bar in response to rotation of the steering shaft 28 and to the fixed bar 94 to lock the slide plate against endwise movement.

Slidable on the upper side of the frame mounting plate 48 is a coupling plate 122 having at its underside a depending tongue 124. This tongue projects through the plate slot 110 and into a recess 126 entering the upper face of the slide plate boss 108. Coupling plate 122 is thereby keyed to the slide plate 106 for endwise movement of these plates in unison. The coupling plate 122 and slide plate 106 are permanently joined in any convenient way, as by screws extending between the plates through the tongue 124 and boss 108. Coupling plate 122 is connected by links 128 to the parallel bar support mechanisms 80 for the drive band guide sprockets 70, 72. These links are pivotally joined at one end to the coupling plate 122 on pivot axes in a common transverse plane of the dolly. The opposite ends of the links are pivotally connected to the parallel bar mechanisms 80 on the axes of the drive band guide sprockets 70.

Considering the description to this point of the adjustable ratio transmission 32, it will be understood that the selector plate 114 is movable endwise to selectively key the coupling plate 122 to any one of the bars 90, 92, 94. When the coupling plate is keyed to either slide plate 90, 92, rotation of the steering shaft 28 moves or displaces the guide sprockets 70, 72 laterally of the drive band runs 64, 66 to alter the turning ratio of the transmission 32. When the coupling plate is keyed to the fixed bar 94, the sprockets 70, 72 are locked in fixed positions during steering shaft rotation.

The steering mode selector or shift lever 30 forms part of an actuating or operating means 130 for shifting the selector plate 114 into engagement with any selected bar 90, 92, 94 by movement of the lever. This selector plate actuating means comprises a shaft 132 rotatably supported in depending bearing brackets 134 fixed to the underside of the lower frame mounting plate 48. Shaft 132 extends transversely of the dolly frame below the guide channel 86 for the slide bars 90, 92 and parallel to the direction of endwise movement of the selector plate 114. Fixed on this shaft at one side of the guide channel 86 is a cylindrical cam 136 containing a spiral cam track 138.

Cam track 138 receives cam follower 140 depending from the underside of a plate 142 located above the cam 136, between the latter and the frame mounting plate 48. The fore and aft ends of plate 142 relative to the fore and aft direction of the dolly are slidable in guide channels 144 fixed to the underside of frame plate 48 and extending parallel to the rotary cam shaft 132. Guide channels 144 thus support the cam follower plate 142 for movement in the endwise direction of movement of the selector plate 114. Rotation of the cam 136 imparts movement in this direction to the cam follower plate. Cam follower plate 142 is spaced from the overlying frame plate 48 to receive therebetween the adjacent end of the selector plate 114. This end of the selector plate carries a depending tongue 146 which engages slidable within a groove 148 in the upper side of the cam follower plate 142.

From the foregoing description, it will be understood that rotation of the cam 136 drives the cam follower plate 142 in the endwise direction of movement of the selector plate 114 and thereby drives the selector plate in this endwise direction through the tongue and groove coupling 146, 148. This tongue and groove coupling permits lateral movement of the selector plate 114 in the endwise direction of movement of the slide bars 90, 92. Thus, assuming the slide bars 90, 92 occupy their normal positions of FIG. 9, wherein the slots 120 in these bars are aligned with the slot 120 in the fixed bar 94, the selector plate 114 may be engaged with any selected bar 90, 92, 94 by appropriate angular positioning of the cam 136. Once engaged with one of the slide bars 90, 92, the selector plate 114 is free to move laterally with endwise movement of the engaged slide bar in response to rotation of the steering shaft cam 84.

Fixed on the cam shaft 132 is a pinion 150 which meshes with a sector gear 152 rotatably supported on the cam shaft bearing bracket 134 adjacent the steering mode selector lever 30. This lever is pivotally supported between its ends on a transverse axis of the dolly by a bearing 154 mounted on the lower frame mounting plate 48. The lower end of this lever projects below the frame plate 48. Extending between the lower projecting end of the lever 30 and the sector gear 152 is a link 154 which is pivotally attached at its ends to the lever and gear. Fore and aft pivoting of the lever thus oscillates the sector gear 152, and hence also the cam 136. This cam oscillation, in turn, moves the selector plate 114 back and forth across the bars 90, 92, 94 of the motion translating mechanism and through its different positions of engagement of its key 118 with the bars. The lever positions in which the selector plate 114 is engaged with the bars 90, 92 and 94, i.e., the lever positions in which the selector plate key 118 is engaged with these bars, are hereafter referred to as its round, conventional and crab steering mode positions, respectively, and are illustrated in FIG. 14.

It will now be understood that the steering mode selector lever 30 is movable to round (FIG. 14A), conventional (FIG. 14B), and crab (FIG. 14C) steering mode positions. In the round steering mode, the selector plate 114 is engaged with the slide bar 90 (FIG. 19) of the motion translating mechanism 82. Rotation of the cam 84 with the steering shaft 28 then displaces the drive band guide sprockets 70, 72 laterally of the drive band runs 64, 66 through the slide bar 90, selector plate 114, coupling plate 106, links 128 and parallel bar mechanisms 80. The sprocket displacement equals the endwise travel imparted to the bar 90 by the cam 84. In the conventional steering mode (FIG. 18), rotation of the steering shaft cam 84 displaces the sprockets 70, 72 laterally of the drive band runs 64, 66 through the slide bar 92, selector plate 114, coupling plate 106, links 128, and the parallel bar mechanisms 80. In this case, the sprocket displacement equals the endwise travel of the slide bar 92 which is one half that of the endwise travel of slide bar 90 and hence one half the sprocket displacement in the round steering mode. Finally, in crab steering mode position of the lever 30, the sprockets 70, 72 are locked to the fixed bar 94 of the motion translating mechanism through the selector plate 114, coupling plate 106, links 128 and parallel bar mechanisms 80 and hence against movement laterally of the drive band runs 64, 66.

As note earlier, the camera dolly steering mechanism 26 also includes an interwheel transmission 36 for coupling the front and rear dolly wheels 14, 16. This transmission has a flexible drive band 156, in this instance a sprocket chain, extending between the front and rear wheels 14, 16 at each side of the dolly frame 12. These drive bands or sprocket chains are disposed within the hollow frame side beams 18. Each drive band or sprocket chain 156 is trained about a sprocket 158 rigid on the journal 42 of the corresponding front wheel 14 and a sprocket 160 rotatable on the journal 42 of the corresponding rear wheel 16. Each rear wheel has a clutch 162 which is operable to crab, round, and conventional steering positions shown in FIGS. 6, 7, 8, respectively. The clutches 162 are conventional and hence need not be described in elaborate detail. Suffice it to say that in the crab steering position of each clutch 162 it couples its sprocket 160 directly to its rear wheel journal 42 for turning of the corresponding front and rear wheels 14, 16 in unison in the same direction. In the round steering position of each clutch, it couples its sprocket 160 to its rear wheel journal 42 through a reversing gear train (not shown) in the clutch, whereby the corresponding front and rear wheels turn in unison but in opposite directions. In its conventional steering position, each clutch 162 disconnects its sprocket 160 from its wheel journal 42 to permit turning of the rear wheels 16 independently of the front wheels 14. The front wheels 14 are then locked against turning, as will be explained presently.

Each clutch 162 is operable to its crab, round, and conventional steering positions by a clutch actuating yoke 164 having arms 166 attached at their free ends to the side wall 44 of the rear frame housing 46 by pivots 168 for vertical swinging movement of the yoke. This yoke is movable to a center position (FIG. 6), an upper position (FIG. 7) and a lower position (FIG. 8) to operate its clutch to its conventional steering position (FIG. 6), its round steering position (FIG. 7) and its crab steering position (FIG. 8), respectively.

The clutch actuating yokes 164 are operatively connected by cranks 170 to the cam shaft 132 of the adjustable ratio transmission 32, whereby rotation of the cam shaft to its positions of FIGS. 6, 7 and 8 operates the clutches 162 to their conventional, round and crab steering positions, respectively. In this regard, it is significant to note here that the cam shaft positions shown in FIGS. 6, 7 and 8 are the positions the shaft occupies in the conventional, round and crab steering modes of the adjustable ratio transmission 32. Each crank 170 includes a connecting rod 172 pivotally connected at one end to the free end of the respective actuator yoke and at its other end to a crank member 174 on the adjacent end of the cam shaft 132. Thus, the rear wheel clutches 162 are operated to their conventional, round, and crab steering positions in response to operation of the transmission 32 to its conventional, round, and crab steering modes, respectively.

In addition to the structure thus far described, the interwheel transmission 36 includes means 176 for locking the front dolly wheels 14 in neutral positions, wherein the wheel are located in fore and aft planes of the dolly, when the dolly steering mechanism 26 is in its conventional steering mode. This front wheel locking means comprises a pair of front wheel locks 177 including lock members 178 operatively engagable with the front wheels to lock the wheels in their neutral positions. The illustrated lock members 178 are levers pivotally mounted within the front ends of the frame beams 18 for swinging in the fore and aft directions of these beams and toward and away from the front wheel journal shafts 42. Fixed on these shafts are lock collars 180 having pairs of diametrically opposed recesses 182 for receiving detents 184 on the locking levers 178 to lock the front wheels against turning when the levers are located in their solid line locking positions of FIG. 3. The levers are urged to these locking positions by springs (not shown). The locking levers 178 and recesses 182 are so located that engagement of the lever detents 184 in the locking recesses 182 locks the wheels in their neutral positions.

Lock releasing means 186 are provided for retracting the locking levers 178 to their broken line released positions of FIG. 3, wherein the front wheels 14 are released to turn, in response to operation of the dolly steering mechanism 26 to its crab and round steering modes. This lock releasing means comprises a rock shaft 188 adjacent and parallel to the transmission cam shaft 132 and rotatably supported in the cam shaft bearing brackets 134. Fixed on the rock shaft 188 is a cam follower arm 190 mounting at its outer end a cam follower 192 engaging a cam 194 fixed on the cam shaft 132. The ends of the rock shaft 188 are located within the frame beams 18. Fixed on these rock shaft ends are arms 196, the outer or free ends of which are connected to the lock levers 178 by links or cables 198. Clockwise rotation of the arms 196 in FIGS. 9 and 11 with rock shaft 188 retracts the lock levers 178 to their broken line released positions of FIG. 3 to release the front wheels 14 for turning on their steering axes.

Figure 11:
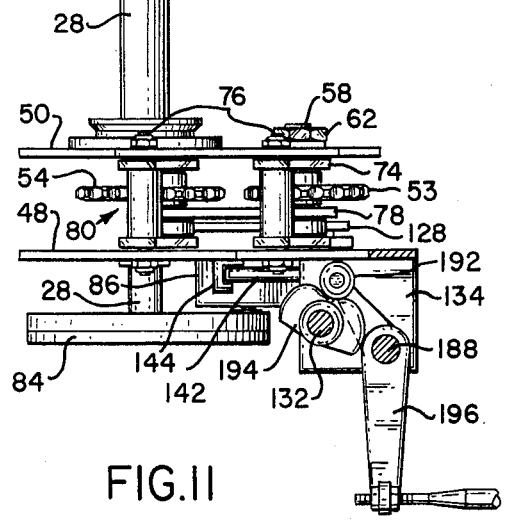
FIG. 11 is a section taken on line 11—11 in FIG. 3.
Figure 13:
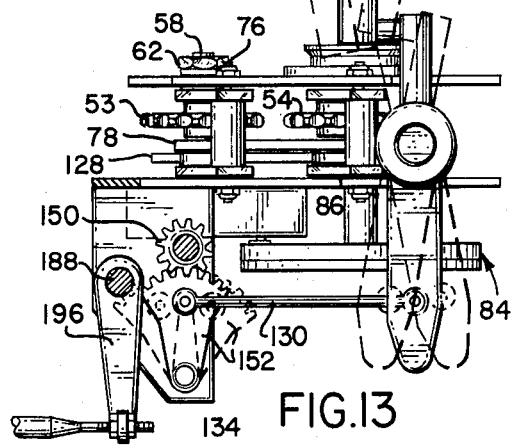
FIG. 13 is a section taken on line 13—13 in FIG. 3.

The wheel lock actuating cam 194 is so shaped and oriented on the cam shaft 132 that when the shaft occupies the position (FIGS. 11, 14B) it assumes in the conventional steering mode of the dolly steering mechanism 26, the rock shaft 188 is free to swing counterclosckwise in FIG. 11 to the position shown wherein the front wheel lock levers 178 are free to enter into locking engagement with the front wheel lock collars 180 under the bias of the lever springs (not shown) to lock the front wheels 14 in their neutral positions. Rotation of the lock actuating cam 194 with the cam shaft 132 from the cam shaft position of FIG. 14B to either the conventional steering position (FIG. 14A) or the crab steering position (FIG. 14C) of the cam shaft effects clockwise rotation of the rock shaft 188 by the lock actuating cam, as seen in FIG. 11, to retract the front wheel lock levers 178 to their broken line released positions of FIG. 3 and release the front wheels 14 to turn with the rear wheels 16.

The operation of the dolly steering mechanism 26 will now be explained. Assume that all four dolly wheels 14, 16 are in their neutral positions in planes parallel to the longitudinal axis of the dolly. The steering shaft camn 84 then occupies its position of FIG. 12 wherein its major axis is also parallel to the longitudinal dolly axis. The steering shaft 28 has an upper transverse steering bar 28a which is normal to the major cam axis and hence at this time is normal to the longitudinal dolly axis. Under these conditions, the three steering mode selector slide bars 90, 92, 94 occupy their positions of FIGS. 9 and 12 wherein their slots 120 are aligned transversely of the bars. Accordingly, the selector plate 114 is free to move endwise back and forth across the slide bars between its round mode steering position of FIG. 14A, its conventional mode steering position of FIG. 14B, and its crab mode steering position of FIG. 14C in response to movement of the steering mode selector lines 30.

Assume first that the steering mode selector lever 30 is placed in its round mode steering position of 14A. The adjustable chain guide members or sprockets 70, 72 of the adjustable ratio transmission 32 are then coupled to the steering selector slide bar 90 for movement transverse to the transmission drive band or sprocket chain runs 64, 66 in response to endwise movement of the slide bar by rotation of the steering shaft cam 84. Accordingly, rotation of the steering shaft 28 in either direction from its initial position will cause upward movement (as viewed in FIGS. 3 and 4) of the slide bar 90 and the adjustable guide sprockets 70, 72, thereby increasing the length of the chain runs 66 and reducing the length of the chain runs 64. Placement of the steering mode selector lever 30 in its round steering mode position also releases the front wheel locks 177 and actuates or conditions the interwheel transmission 36 to couple the front and rear wheels 14, 16 at each side of the dolly to one another through the reversing gears in the clutches 170. The front and rear wheels at each side of the dolly are thus coupled together to turn in unison but in opposite directions on their steering axes.

Consider now the action of the steering mechanism 26 when the steering shaft 28 is rotated with the steering mode selector level 30 in its round steering mode position, assuming first that the steering shaft is rotated clockwise in FIG. 3. Clockwise rotation of the steering shaft tends to rotate both rear wheels 16 clockwise through the same angle as the shaft and each front wheel 14 counterclockwise through the same angle as its respective rear wheels. These equal rotation angles of the rear wheels 16, however, are altered by the movement of the guide sprockets 70, 72 which occurs transverse to the sprocket chain runs 64, 66 in response to rotation of the cam 84 with the steering shaft 28. Thus, rotation of the cam with the shaft effects upward movement (in FIGS. 3 and 4) of the sprockets 70, 72 relative to the chain runs 64, 66, thereby reducing the lengths of the upper runs 64 and increasing the lengths of the lower runs 66.

With the assumed clockwise steering shaft rotation, this shortening of the sprocket chain runs 64 and lengthening of the chain runs 66 increases the rotation angle of the right-hand rear wheel sprocket 56 and reduces the rotation angle of the left-hand rear wheel sprocket 56 in FIG. 3. Counterclockwise rotation of the steering shaft has the same effect except that the rotation angle of the left-hand rear wheel sprocket 56 is increased and the rotation angle of the right-hand sprocket is reduced. Thus, clockwise rotation of the steering shaft 28 through a given angle effects clockwise rotation of the right-hand rear wheel 16 and counterclockwise rotation of the right-hand front wheel 14 through an angle greater than the steering shaft rotation angle. This steering shaft rotation also effects clockwise rotation of the left rear wheel 16 and counterclockwise rotation of the left front wheel through an angle less than the steering shaft rotation angle. Counterclockwise rotation of the steering shaft has the same effect except that then the turning angles of the two left wheels exceeds the steering shaft rotation angle and turning angles of the two right wheels are less than the shaft rotation angle.

Figure 12:
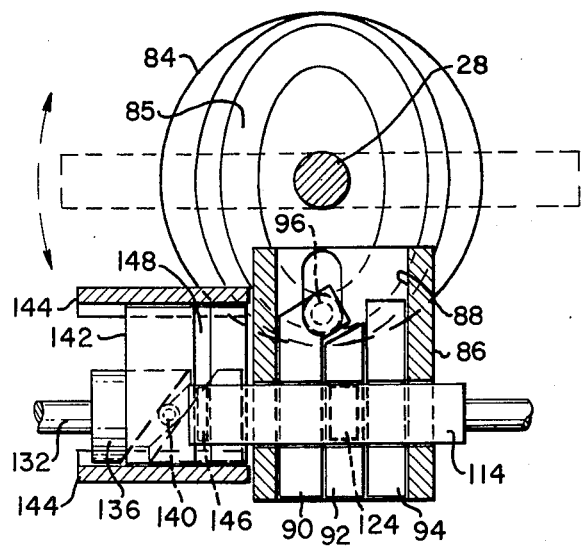
FIG. 12 is a section taken on line 12—12 in FIG. 10.

The steering shaft cam 84 is so shaped, the guide sprocket support arms 74 are so sized in length, the guide sprockets 70, 72 are so located along the chain runs 64, 66 and the adjustable ratio transmission 32 is otherwise so constructed and arranged that rotation of the steering shaft 28 through 90° from the position of FIG. 12 effects rotation of the dolly wheels 14, 16 to their round steering positions of FIG. 19, wherein the wheel rotation axes all intersect approximately at the geometric center of the four wheels and of the dolly as a whole. Movement of the dolly is then circular about this center point. During turning of the steering shaft between the 90° position and the original position of FIG. 12, the wheel rotation axes intersection point moves back and forth along a transverse axis of the dolly passing through the geometric center point of axis intersection in FIG. 19, and dolly movement occurs along an arcuate path about this intersection point.

Assume next an initial dolly condition wherein the steering shaft 28 is again in its neutral position of FIG. 12 with the dolly wheels 14, 16 in their neutral positions but with the steering mode selector lever 30 in its conventional steering mode position of FIG. 14B. The adjustable guide sprockets 70, 72 of the adjustable ratio transmission 32 are then coupled to the steering mode selector slide bar 92 for movement with the latter bar transverse to the sprocket chain runs 64, 66 upon rotation of the steering shaft 28. The front wheel locks 177 are engaged to lock the front wheels 14 in their neutral positions. Under these conditions, rotation of the steering shaft turns only the rear wheels 16 while the front wheels 14 remain locked in their neutral positions, as shown in FIG. 18. Also rotation of the steering shaft in either direction causes differential rotation of the two rear wheels in that direction in essentially the same manner as described above in connection with round steering.

In conventional mode steering, however, the adjustable ratio transmission sprockets 70, 72 are coupled to the steering mode selector slide bar 92 which, and hence also the latter sprockets, move only one half the distance of slide bar 90, for a given rotation angle of the steering shaft 28. The adjustable ratio transmission 32 is so constructed and arranged that in this conventional steering mode, rotation of the steering shaft 28 in either direction from its position of FIG. 12 effects differential rotation of the rear wheels 16 in that direction in such a way that their rotation axes intersect at a point which is located approximately on and moves back and forth along the common rotation axis of the locked front wheels 14. Dolly movement then occurs along an arcuate path about the rear wheels axes intersection point except when the rear wheels occupy their neutral positions wherein the dolly is movable straight forward and backward.

Finally assume an initial dolly condition wherein the steering shaft 28 is again in its neutral position of FIG. 12 with the steering mode selector lever 30 in its crab steering mode position of FIG. 14C. The adjustable guide sprockets 70, 72 of the adjustable ratio transmission 32 are now coupled to the fixed steering selector bar 94 and hence remain stationary during rotation of the steering shaft 28. The front wheel locks 177 are again released, and the front and rear wheels 14, 16 are coupled to one another by the clutches 162 for rotation of all four wheels in unison in the same direction. Rotation of the steering shaft 28 thus rotates all four wheels in the same direction and through the same angle. Accordingly, movement of the dolly occurs along a straight line in every position of the steering shaft and may occur in any direction of the dolly by appropriate angular positioning of the steering shaft.

It will now be understood, therefore, that the present dolly steering mechanism 26 may be selectively conditioned for round, conventional and crab steering modes by first rotating the steering shaft 28 to its neutral position of FIG. 12 and moving the steering selector lever 30 to the desired steering mode position. These three steering modes are accomplished with the single steering shaft cam 84.

The configuration of the steering shaft cam track 85 may be determined in various ways. As presently contemplated, this cam track configuration is determined, effectively, by (a) replacing the cam 84 by a blank cam or pattern disk and the cam follower 96 by a stylus, (b) manually rotating the rear wheel 16 thru the steering positions they occupy in the round steering mode of the dolly (i.e. positions wherein the wheel rotation axes intersect at a common point along an axis passing midway between the front and rear wheels normal to the longitudinal dolly axis) (c) marking the pattern disc with the stylus in these wheel positions to produce on the disc a trace of the center line of the cam track for the round steering mode, and (d) forming a cam track to conform to this trace. This procedure is best carried out using a cam profile generating machine or tool effectively duplicating the essential elements of the actual steering mechanism, namely the steering shaft sprocket 54, idler sprocket 53, rear wheel sprockets 56, drive band or sprocket chain 52, the drive band run deflecting or displacing guides 70, 72 and their pivotal support arms 74, the cam or pattern disc fixed to the steering shaft sprocket, and the stylus which replaces the cam follower. This stylus is connected to the run guides 70, 72 to move with these guides in the same manner as the actual cam follower.

Rotation of the wheel sprockets (56) of this cam profile generating machine thru angular positions corresponding to the round steering positions of these sprockets causes the drive band or sprocket chain runs (64, 66) to displace or move laterally and the run guides (70, 72) to move with the chain runs in essentially the same manner as described earlier in connection with the round steering mode of the dolly. It will be understood, of course, that in this cam profile generating or defining operation the wheel sprockets drive the drive band or sprocket chain and the chain runs displace the run guides rather than the reverse which occurs in the actual round steering mode of the dolly. The stylus moves with the run guides across the pattern disc and is caused to mark this disc in such a way as to form on the disc a trace defining the proper round mode steering profile or configuration for the steering shaft cam track 85.

Rotation of the wheel sprockets (56) of the profile generating machine thru their simulated round mode steering postions may be accomplished as follows. First, the angles of these sprockets relative to a fixed reference, such as the common axis of the respective wheels (16) in their neutral positions, at arbitrarily selected round mode steering position, are determined by geometric construction and/or trigonometric computation, starting with the sprockets in their round steering positions of FIG. 19, wherein the rotation axes of the wheels 14, 16 all intersect approximately at a midpoint between and equidistant from the four wheels (i.e. the approximate midpoint of the dolly). The wheel angles may then be determined for a number of different positions of the wheel axis intersection point located at equally spaced intervals, for example, along an axis passing thru the midpoint normal to the longitudinal dolly axis. The wheel sprockets (56) of the generating machine are the rotated to these angles and the corresponding stylus positions are recorded on the cam pattern disc.

According to prior art teachings, this same procedure would be used to define a second cam for conventional mode steering, as noted earlier, however, this use of two cams is undesirable from the standpoint of cost and complexity.

A feature of this invention resides in the discovery that the same steering shaft, cam 84, defined as described above, may be used for conventional steering by reducing by one half the travel or displacement imparted to the drive band or sprocket chain runs 64, 66 per unit rotation angle of the cam. This is based on the fact that in conventional steering, the rear wheel axes intersect approximately at a common point along the common axis of the front wheels 14 in their neutral positions. As a consequence, in any two corresponding round and conventional steering positions, wherein the round and conventional wheel axes intersection points are located on an axis intersecting the midpoint of the common neutral axis of the rear wheels, the effective turning radius in conventional steering is about one half the round steering radius. It has been found that approximately halving the chain run displacement in the conventional steering mode, as explained above, achieves, with a very high degree of approximation, well within the limits required for a camera dolly, for example, the rear wheel steering angles or positions required for conventional steering. According to this invention, this halving of the drive band or sprocket chain run displacement in the conventional steering mode is accomplished by ratio selector means 104 described earlier. The resulting steering shaft cam track 85 defined in this manner conforms closely to an elliptical configuration.

I claim:

1. A steering mechanism for a dolly such as a camera dolly having a frame, a first pair of wheels at one end of said frame, a second pair of wheels at the other end of said frame, means supporting each wheel on said frame for steering rotation of the wheel relative to the frame, and a rotatable steering shaft on said frame, said steering mechanism comprising:

adjustable ratio transmission means drivably coupling said steering shaft and said first wheels for steering rotation of said first wheels by said steering shaft with a turning ratio equal to the wheel steering rotation angle per unit steering shaft rotation angle, and second interwheel transmission means selectively coupling said second wheels to said first wheels for steering rotation of said second wheels with said first wheels and locking said second wheels against steering rotation relative to said frame, and said adjustable ratio transmission means comprising endless flexible drive band means coupling said steering shaft to said first wheels for steering rotation of said first wheels by said steering shaft through said drive band means, said drive band means having first and second runs between said steering shaft and each first wheel shaft and said runs being laterally adjustable to increase the length of either run and decrease the length of the other run during steering rotation of said wheels by said steering shaft in such a way as to vary said turning ratio between said steering shaft and the respective first wheel, and means for laterally adjusting said first and second runs in unison during and at different selected rates relative to the turning rate of said steering shaft.

2. The steering mechanism of claim 11 wherein: said run adjusting means are operatively connected between said drive band runs and said steering shaft for laterally adjusting said runs in response to rotation of said steering shaft.

3. The steering mechanism of claim 2 wherein: said drive band run adjusting means comprises a cam rotatable by said steering shaft, run guides engaging said runs and mounted on said frame for movement along transverse direction lines of said runs to laterally adjust said runs, and presettable variable ratio motion translating means operatively connecting said cam and guides for effecting movement of said guides along said direction lines by said cam during cam rotation by said steering shaft with a presettable variable translation ratio equal to the travel of said guides along said direction lines per unit steering shaft rotation angle.

4. The steering mechanism of claim 3 wherein: said motion translating means comprises first and second parallel slides mounted side by side on said frame for endwise movement relative to one another and to said frame, follower means on said first slide engaging said cam for endwise movement of said first slide by rotation of said cam, means connecting said slides to one another and to said frame for endwise movement of said second slide with said first slide with a given ratio other than unity of the endwise travel of said second slide relative to the endwise travel of said first slide, and presettable selector means for selectively connecting said guides to either slide for movement of said guides along said direction lines by endwise movement of the respective slide.

5. The steering mechanism of claim 4 wherein: said selector means is operable to selectively connect said guides to said frame for retaining said guides stationary during rotation of said drive shaft.

6. The steering mechanism of claim 5 wherein: said selector means comprises a coupling member mounted on said frame for movement parallel to said slides, a selector device for connecting said coupling member to either slide for endwise movement with the respective slide, and means connecting said guides to said coupling member for movement of said guides along said direction lines by said coupling member movement.

7. The steering mechanism of claim 1 wherein: said run adjusting means are selectively operable to retain said transmission runs laterally stationary during rotation of said wheels by said steering shaft.

8. The steering mechanism of claim 1 wherein:
said adjustable ratio transmission means is operable in round and conventional steering modes having different turning ratios,
said interwheel transmission means includes means for coupling the wheels at each side of said dolly for steering rotation thereof in unison in opposite directions in said round steering mode and locking said other wheels to said frame with their axis aligned normal to the longitudinal axis of said frame in said conventional steering mode, and
said steering mechanism is operable in said round steering mode to steer said wheels in such a way that their rotation axes intersect approximately at a common point along an axis passing approximately midway between said wheel pairs normal to said longitudinal frame axis, and operable in said conventional steering mode to steer said adjacent wheels in such a way that their rotation axes intersect approximately at a common point along the axes of said other wheels.

9. The steering mechanism of claim 8 wherein:

said adjustable ratio transmission means is operable in a crab steering mode in which said drive band runs are laterally stationary and includes means for securing said run adjusting means against movement laterally of said runs in said crab steering mode, said interwheel transmission means includes means for coupling the wheels at each side of said dolly for steering rotation thereof in unison in the same directions in said crab steering mode, and said steering mechanism is operable in said crab steering mode to steer said wheels in such a way that their rotation axes remain substantially mutually parallel.

10. The steering mechanism of claim 6 wherein:

said adjustable ratio transmission means is operable in round and conventional steering modes having different turning ratios, said interwheel transmission means includes means for coupling the wheels at each side of said dolly for steering rotation thereof in unison in opposite directions in said round steering mode and locking said other wheels to said frame with their axis aligned normal to the longitudinal axis of said frame in said conventional steering mode, and said steering mechanism is operable in said crab steering mode to steer said wheels in such a way that their rotation axes remain mutually paralled.

11. The steering mechanism of claim 1 wherein:

said adjustable ratio transmission means is operable in a crab steering mode in which said drive band runs are laterally stationary and includes means for securing said run adjusting means against movement laterally of said runs in said crab steering mode, said interwheel transmission means includes means for coupling the wheels at each side of said dolly for steering rotation thereof in unison in the same directions in said crab steering mode, and said steering mechanism is operable in said crab steering mode to steer said wheels in such a way that their rotation axes remain substantially mutually parallel.

12. In a steering mechanism for a dolly such as a camera dolly having a frame, a pair of steerable wheels at one end of said frame, means supporting said wheels on said frame for steering rotation of the wheels relative to the frame, and a rotatable steering shaft on said frame adjacent said wheels, the combination comprising:

endless flexible drive band means coupling said steering shaft and wheels for steering rotation of said wheels by said steering shaft through said drive band means, said drive band means having first and second runs between said steering shaft and each wheel and said runs being laterally adjustable to increase the length of either run and decrease the length of the other run during steering rotation of said wheels by said steering shaft and in such a way as to vary the steering rotation angle of the respective wheel per unit steering shaft rotation angle, and means for laterally adjusting said first runs and second runs in unison during and at different selected rates relative to the turning rate of said steering shaft.

13. The combination of claim 12 wherein: said run adjusting means are operatively connected between said drive band runs and said steering shaft for laterally adjusting said runs in response to rotation of said steering shaft.

14. The combination of claim 13 wherein: said drive band run adjusting means comprises a cam rotatable by said steering shaft, run guides engaging said runs and mounted on said frame for movement along transverse direction lines of said runs to laterally adjust said runs, and presettable variable ratio motion translating means operatively connecting said cam and guides for effecting movement of said guides along said direction lines by said cam during cam rotation by said steering shaft with a presettable variable translation ratio equal to the travel of said guides along said direction lines per unit steering shaft rotation angle.

15. The combination of claim 14 wherein: said motion translating means comprises first and second parallel slides mounted side by side on said frame for endwise movement relative to one another and to said frame, follower means on said first slide engaging said cam for endwise movement of said first slide by rotation of said cam, means connecting said slides to one another and to said frame for endwise movement of said second slide with said first slide with a given ratio other than unity of the endwise travel of said second slide relative to the endwise travel of said first slide, and presettable selector means for selectively connecting said guides to either slide for movement of said guides along said direction lines by endwise movement of the respective slide.

16. The combination of claim 15 wherein: said selector means is operable to selectively connect said guides to said frame for retaining said guides stationary during rotation of said steering shaft.

17. The combination of claim 16 wherein: said selector means comprises a coupling member mounted on said frame for movement parallel to said slides, a selector device for connecting said coupling member to either slide for endwise movement with the respective slide, and means connecting said guides to said coupling member for movement of said guides along said direction lines by said coupling member movement.

18. The combination of claim 17 wherein: said run adjusting means are selectively operable to retain said transmission runs laterally stationary during steering rotation of said wheels by said steering shaft.

* * * * *